United States Patent [19]
Cesaroni

[11] Patent Number: 6,001,291
[45] Date of Patent: Dec. 14, 1999

[54] METHOD OF BONDING TUBES INTO AN ARTICLE

[76] Inventor: Anthony Joseph Cesaroni, 9 Heathmore Court, Unionville, Ontario, Canada, L3R 8J1

[21] Appl. No.: 08/791,236

[22] Filed: Jan. 30, 1997

Related U.S. Application Data

[60] Provisional application No. 60/011,297, Feb. 7, 1996.

[51] Int. Cl.⁶ .......................... B29C 57/00; B29C 65/20; B29C 65/52
[52] U.S. Cl. .......................... 264/134; 264/249; 264/759; 264/327; 264/269; 425/392; 156/293
[58] Field of Search .................................. 264/134, 259, 264/327, 249, 277, 269; 425/392; 156/293

[56] References Cited

U.S. PATENT DOCUMENTS

| | | | |
|---|---|---|---|
| 2,433,546 | 12/1947 | Cornelius | 18/59 |
| 3,253,841 | 5/1966 | Ahmad | 285/55 |
| 3,459,622 | 8/1969 | Fisher | 156/423 |
| 3,841,938 | 10/1974 | Groose-Holling et al. | 156/293 |
| 3,843,300 | 10/1974 | McFarlane | 425/384 |
| 4,446,084 | 5/1984 | Rowley | 264/327 |
| 4,641,862 | 2/1987 | Gardiner | 285/39 |
| 4,834,930 | 5/1989 | Gemeinhardt | 264/259 |

FOREIGN PATENT DOCUMENTS

| | | |
|---|---|---|
| 565592 | 11/1944 | United Kingdom . |
| 952042 | 3/1964 | United Kingdom . |
| 2273459 | 12/1992 | United Kingdom . |
| WO 91/16191 | 4/1991 | WIPO . |
| WO 93/16346 | 8/1993 | WIPO . |

*Primary Examiner*—Jan H. Silbaugh
*Assistant Examiner*—Edmund H. Lee
*Attorney, Agent, or Firm*—Richard H. Burgess

[57] ABSTRACT

A method for bonding tubes into an article, each of which is formed from a thermoplastic polymer, especially an aliphatic polyamide. The article has a plurality of channels into which tubes are placed in sliding engagement. The article is moved towards a heating block having pins, such that a pin is inserted into each tube. The article and heating block are brought into a juxtaposed position such that the polymer of the tubes melts and forms a coating on said article. The method is particularly useful in the formation of tubed heat exchangers, for example with 100–300 or more tubes, in one cycle.

9 Claims, 3 Drawing Sheets

METHOD OF BONDING TUBES INTO AN ARTICLE

CROSS REFERENCE TO RELATED APPLICATIONS

This application claims priority from Provisional Application 60/011,297 filed Feb. 7, 1996.

FIELD OF THE INVENTION

The present invention relates to a method of bonding tubes into articles in a fluid-tight manner, so as to provide fluid flow communication in and through the articles, through the tubes. In particular, the tubes extend in part through channels in the articles and are bonded thereto. In preferred aspects of the present invention, the method relates to the bonding of tubes into articles that form all or part of headers or manifolds, in the manufacture of plastic heat exchangers, especially heat exchangers manufactured from polyamide compositions. In aspects, the method relates to the bonding of at least 10 such tubes, especially at least 100 tubes.

BACKGROUND OF THE INVENTION

Heat exchangers formed from thermoplastic polymers and methods for the manufacture of such heat exchangers are known. For instance, a number of heat exchangers formed from thermoplastic polymers and methods for the manufacture thereof are disclosed in PCT Patent Application WO 91/02209 of A. J. Cesaroni, published Feb. 21, 1991, and in the published patent applications referred to therein. Thermoplastic polymer heat exchangers of a tubular construction are described in U.S. Pat. Nos. 4,923,004, and 5,078,946, issued May 8, 1990 and Jan. 7, 1992, respectively, both of E. L. Fletcher and T. H. Kho, in which tubes are integrally formed with a manifold section in a moulding or similar process. A preferred material of construction for the heat exchangers is polyamide, especially aliphatic polyamide.

While heat exchangers formed from thermoplastic polymers have been fabricated by the techniques described in the above patents and published patent applications, improvement in the construction and methods of fabrication would be beneficial to add further flexibility and economy to the fabrication and use of heat exchangers formed from thermoplastic polymers. In particular, assembly of tubes into headers or manifolds or other structures in the manufacture of tube heat exchangers is usually a tedious and time-consuming process, often involving use of adhesives to bond the tubes into position. The manufacture of heat exchangers from polyamides can pose unique and difficult problems, especially when compared with use of other polymers, but the resultant heat exchangers have many advantages over heat exchanges from other polymers.

A process for connecting bodies having hollow sections e.g. tubes, to moulded bodies made of a thermoplastic polymer is disclosed by H. Gross in U.S. Pat. No. 4,773,956. A process and apparatus for face welding bundles of thermoplastic polymer mouldings under pressure is disclosed by H. Gross et al in U.S. Pat. No. 4,797,173. The process relates to the face welding of extruded thermoplastic polymer mouldings e.g. tubes, having end faces that lie in a plane. The end faces are pressed against a heatable and coolable plate in which grooves have been formed corresponding to the cross-section of the end face, and the polymer is heated until molten. A hexagonal honeycomb-like structure of tubes is formed. While such a process may be effective in forming honeycomb structures, it is complex and not adapted to inserting tubes into articles.

An efficient and economical method of bonding large numbers of tubes into an article e.g. in the manufacture of a heat exchanger, would be beneficial.

SUMMARY OF THE INVENTION

A method for the bonding of thermoplastic polymer tubes into thermoplastic polymer articles in a fluid tight manner has now been found.

Accordingly, an aspect of the present invention provides a method for bonding a tube into an article, each of which is formed from a thermoplastic polymer, said article having at least one channel extending therethrough from a first surface to a second surface, such channel being linear and being of a shape and size to accommodate said tube in sliding engagement such that the tube may be passed through the article from the first surface to the second surface to provide fluid flow communication through the article; comprising the steps of:

(i) inserting said tube into the linear channel such that it extends through said article and extends from said first surface to beyond said second surface;

(ii) placing said tube extending beyond the second surface in sliding engagement over a pin, said pin being maintained at a temperature of less than the melting point of the thermoplastic polymer of the tube, said pin being located in and extending from a heating block capable of being heated to a temperature of greater than the melting point of the thermoplastic polymer of the tube;

(iii) controlling said heating block at a temperature above said melting point;

(iv) moving said heating block towards the second surface to a position juxtaposed the second surface, such that the tube contacts the heating block and the polymer of the tube melts and forms at least a partial coating thereof on said second surface, thereby sealing the tube to the article;

(v) cooling said article; and (vi) separating said article from said pin and said heating block.

In a preferred embodiment of the method of the present invention, there are a plurality of channels through said article in an aligned relationship, especially at least 100 channels.

In another embodiment, each pin of step (ii) is cooled, especially by passing cooling fluid eg. water or oil internally through said pin.

In yet another embodiment, each pin is a capped hollow pin having internal fluid inlet tubes through which cooling fluid is passed, especially where such fluid subsequently passes between said internal fluid inlet tube and said pin.

In a still further embodiment, the pin of step (c) has a ceramic tip.

In a further embodiment, the tube and article are formed from an aliphatic polyamide.

In a still further embodiment, the tube is coated with an adhesive to promote adhesion to the polymer of the article and/or said tube is a coextruded tube with the outer layer promoting bonding of said tube to the polymer of the article.

In a further embodiment, the article is part of a header or manifold for a plastic heat exchanger.

In another aspect, the present invention provides apparatus for bonding a plurality of tubes into an article having channels into which said tubes slidingly engage, said tubes and articles being formed of thermoplastic polymer, comprising:

(a) a heating block having a planar heating surface;

(b) a plurality of elongated pins extending from said heating surface in a parallel and spaced-apart relationship, said pins being thermally insulated from said heating block and having tips capable of insertion into said tubes;

(c) holding means for retaining said article with tubes extending therefrom, and for positioning said pins and tubes in a cooperating aligned relationship; and (d) means for moving said article towards said heating block, such that said pins slidingly insert into said tubes and said tubes contact said heating block.

In a preferred embodiment of the apparatus of the present invention, the pins of (b) are cooled pins, especially fluid cooled pins, particularly water- or oil-cooled pins.

In another embodiment, the pins are closed hollow pins having internal fluid inlet tubes therein extending substantially to the tip of each pin and adapted for flow of cooling fluid through said inlet tubes for cooling of said pins.

In yet another embodiment, the pins of (b) have ceramic tips.

BRIEF DESCRIPTION OF THE DRAWINGS

The method of the present invention will be particularly described with reference to the embodiments shown in the drawings in which.

DETAILED DESCRIPTION OF THE INVENTION

Figure 1:
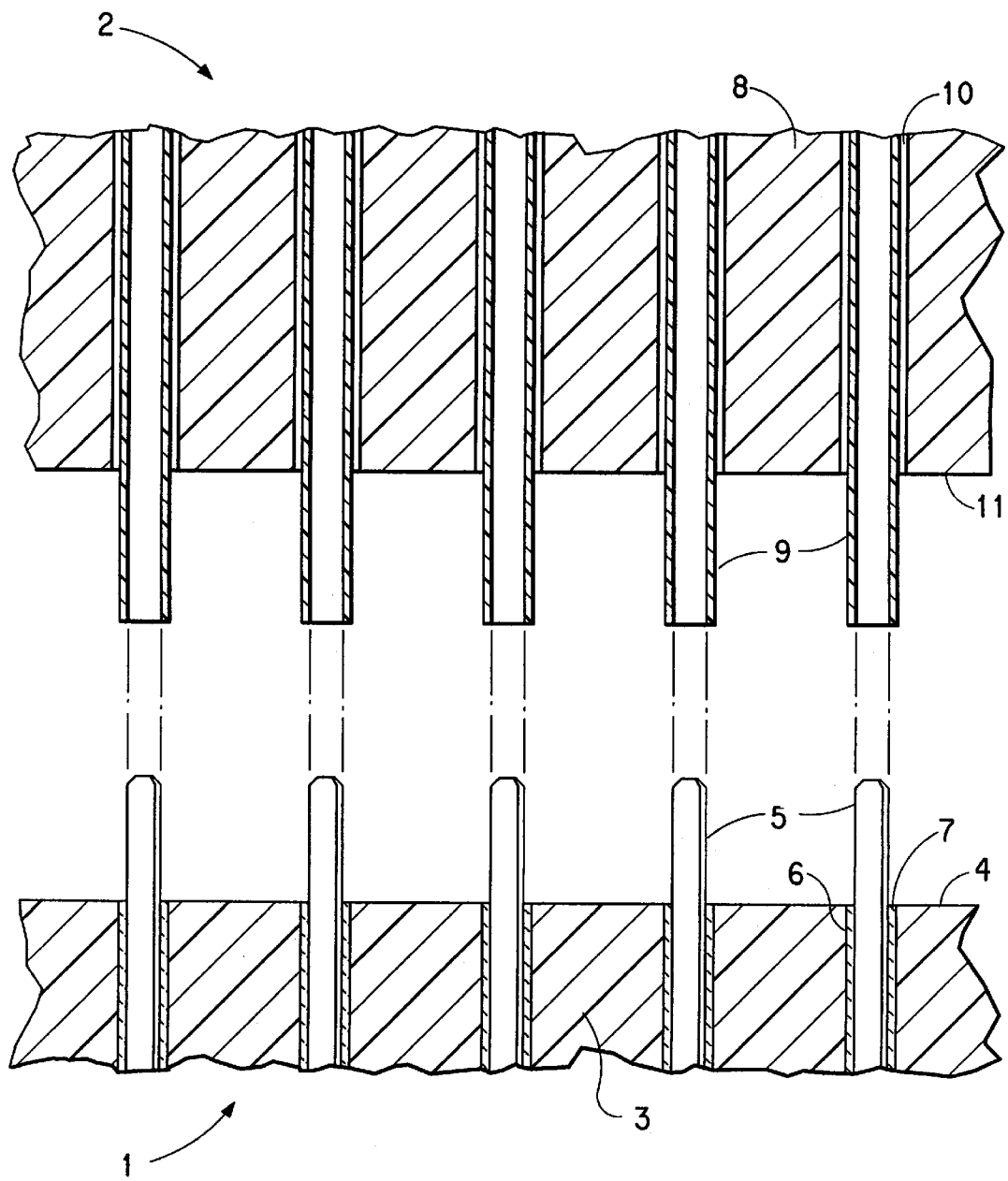
FIG. 1 is a schematic representation of a heating block and an article in a spaced-apart relationship.

FIG. 1 shows a block, generally indicated by 1, and an article, generally indicated by 2. Article 2 is located opposite block 1. Block 1 has heating block 3 with pins 5 extending therethrough. Heating block 3 has upper surface 4 which is a planar surface and is disposed towards article 2. Pins 5 are located in channels 6 of heating block 3, and extend beyond upper surface 4 towards article 2. As shown in FIG. 1, thermal insulation 7 is located between pins 5 and heating block 3, within channel 6.

Article 2 is comprised of channeled block 8 through which tubes 9 pass. Tubes 9 are located within article channels 10, and extend beyond article surface 11. Block 1 would normally have the same number of pins 5 as the number of article channels 10 in channeled block 8.

As shown in FIG. 1, upper surface 4 of block 1 and surface 11 of article 2 are planar surfaces. It is to be understood that such surfaces do not need to be planar surfaces, but could be surfaces of different shapes. It is, however, preferred that upper surface 4 and article surface 11 be of cooperative shapes, especially mating surfaces and more preferably planar surfaces such that when the tubes are bonded together, as described herein, a relatively uniform layer of thermoplastic polymer is formed on surface 11 of article 2.

Figure 2:
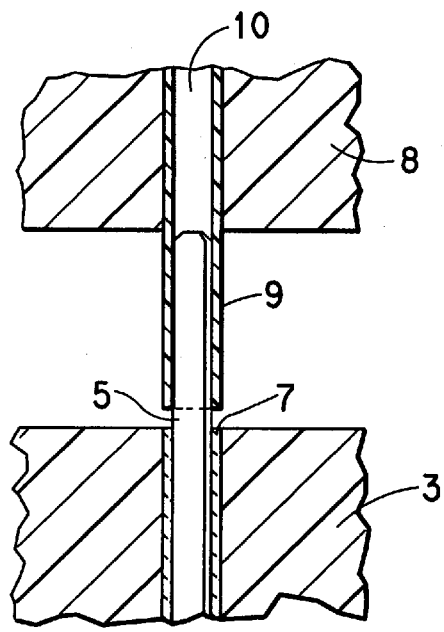
FIG. 2 is a schematic representation of a pin inserted into a tube.

FIG. 2 shows heating block 3 and channeled block 8 in a closer relationship than shown in FIG. 1. In FIG. 2, pin 5 has become inserted within tube 9. It is understood that the diameter of pin 5 should be substantially the same, but slightly smaller than, the internal diameter of tube 9 such that pin 5 can be slidingly inserted within tube 9. Such relative sizing will result in substantial retention of the integrity of tube 9 that is within channeled block 8 during the process i.e. not result in significant narrowing of the diameter of tube 9. It is to be understood that the tip of pin 5 may be tapered in a manner that permits ready insertion of pin 5 into tube 9 during operation of the process. Moreover, the distance that tube 9 extends beyond surface 11 should be similarly controlled to permit ready insertion of pins 5 into tubes 9, especially if the tubes exhibit any tendency to bend or curl when in an unrestrained position.

Figure 3:
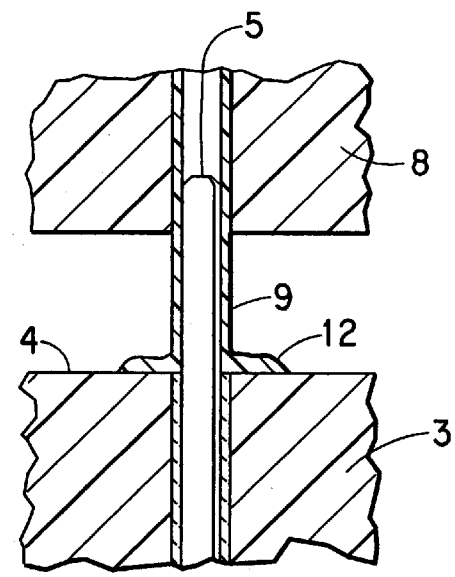
FIG. 3 is a schematic representation of the formation of a melt pool.

FIG. 3 shows block 3 and channeled block 8 in a closer relationship than shown in FIG. 2. Tube 9 has come into contact with surface 4 of heating block 3 and has become molten, forming melt pool 12.

Figure 4:
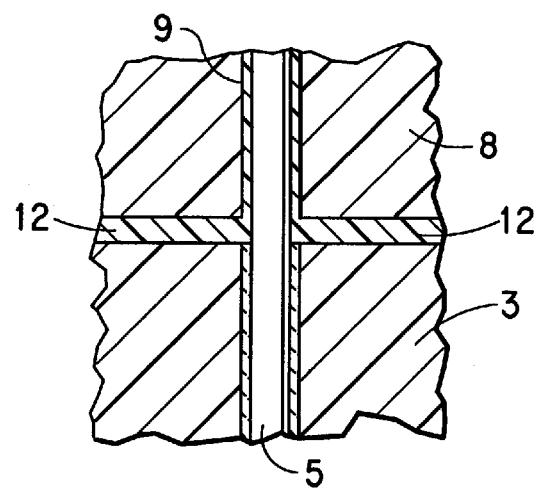
FIG. 4 is a schematic representation of the heating block and article in ajuxtaposed relationship.

In FIG. 4, heating block 3 is in its closest proximity to channeled block 8. Pin 5 remains inserted within tube 9. Melt pool 12 has undergone flow so as to form a continuous pool of molten polymer extending away from the position of pin 5 and tube 9 in all directions.

Figure 5:
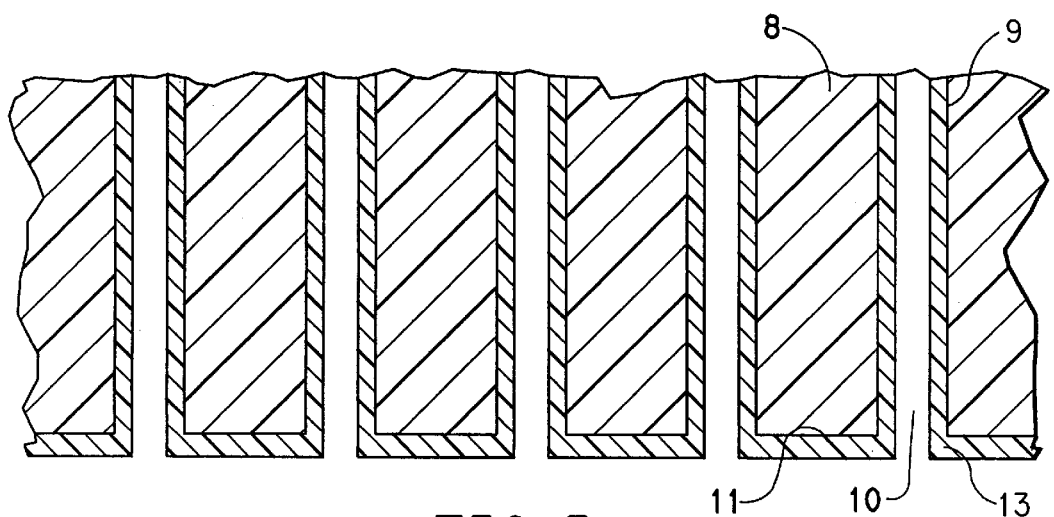
FIG. 5 is a schematic representation of the article after the tubes have been bonded thereto.

FIG. 5 shows channeled block 8 after separation from heating block 3. Channeled block 8 now has tube 9 located within channel 10 with a layer 13 of polymer formed across surface 11 of channeled block 8. Tubes 9 have thus become bonded to channeled block 8. Layer 13 was formed on cooling of melt pool 12.

In operation, tubes 9 are inserted through channels 10 of article 8 such that the ends of tubes 9 extend beyond surface 11 of article 8. It is preferred that article 8 has the same number of channels 10 as the number of pins 5 on heating block 3. Heating block 3 is heated to a temperature sufficient to effect melting of the polymer used in the formation of tubes 9. Pins 5 are at a temperature of less than the melting point of the polymer of tubes 9 and preferably less than the softening point of such polymer, such that pins 5 will readily slide into and along tube 9. Thus, tubes 9 retain their integrity within channeled block 8, to permit fluid flow therethrough.

Article 8 and heating block 3 are brought into close proximity. This may be done by moving either article 8 or heating block 3, usually the former. Each pin 5 on heating block 3 becomes inserted within corresponding tube 9 on article 8. It is understood that tube 9 should have sufficient rigidity over the length extending beyond surface 11 such that alignment of the interior of tube 9 with pin 5 is readily accomplished. The distance that tube 9 extends beyond surface 11 may be relatively short, but it may also be several times the tube diameter.

Heating block 3 and article 8 are brought into close proximity. In doing so tube 9 contacts surface 4 of heating block 3 and the polymer thereof becomes molten. The molten polymer, 12, is forced to spread away from pin 5. As heating block 3 and article 8 come into close proximity, the molten polymer 12 forms a continuous layer, or substantially continuous layer, of polymer on the surface of article 8. Heating block 3 is then withdrawn from the position close to article 8 leaving article 8 with the layer of polymer, which quickly cools and solidifies. It is understood that surface 4 of heating block 3 should have a surface such that it may readily be separated from molten polymer 12. While it is not essential to do so, it may be more convenient to position heating block 3 above article 8, such that on separation there is no significant tendency for polymer to melt flow e.g. to sag or drip while still molten. In addition, as pin 5 is separated from its position within tube 9, the cool nature of pin 5, compared to the melting point of the polymer, ensures that polymer adjacent to the pin remains solidified and forms an opening to channel 10 extending through article 8 i.e. blockage of channel 10 by molten polymer should not occur. However, if necessary, channel 10 could be reamed out to ensure an effective opening.

It is understood that cooling fluids e.g. air, water in the form of a mist and liquid water may be used to cool the polymer after separation of heating block 3 from article 8.

In continuous operation of the process eg. when a series of articles are bonded to tubes using the process and apparatus of the invention, it may be found that the pins retain sufficient heat between cycles of the process to cause sticking of the pins to the tubes and/or associated melting effects, resulting in distortion of the tubes. This might particularly occur in tubes extending away from the article on the part of the article opposed to article surface 11, especially when the relative length of the pins and thickness of the article are such that the pins extend completely through the article into sections of the tubes extending therefrom. An example of this would be in the manufacture of some types of tubed heat exchanges.

Figures 6A, 6B:
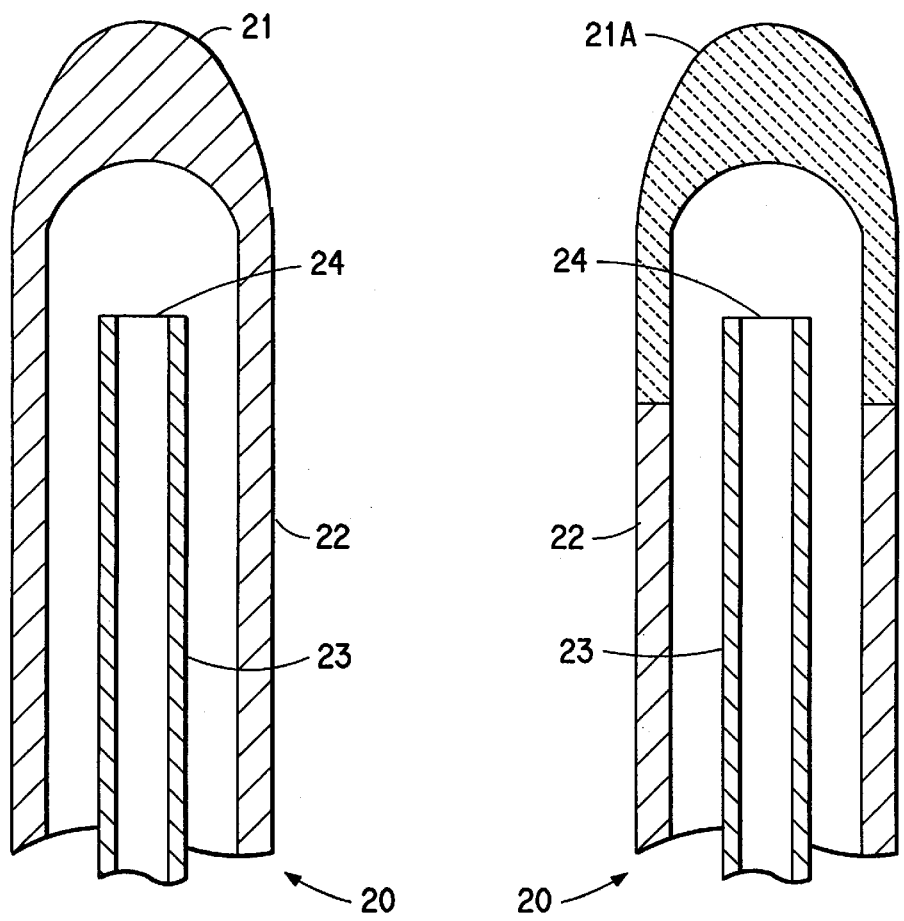
FIGS. 6A and 6B are schematic representations of cross-sections of pins.

The use of cooled pins may alleviate sticking of pins to tubes or otherwise improve the process. Examples of cooled pins are shown in FIGS. 6A and 6B. FIG. 6A shows a pin, generally indicated by 20, having a tip 21. Pin 20 is a hollow pin, being tubular in nature, with outer wall 22. Fluid inlet tube 23 is located within pin 20, being spaced apart from outer wall 22 of pin 20. Outlet 24 of fluid inlet tube 23 is spaced away from tip 21. In embodiments, pin 20 is shaped and especially insulated in the region of block 3 to minimize transfer of heat from block 3 to pin 20. FIG. 6B shows an embodiment of the pin of FIG. 6A in which outer wall 22 is formed of one material and tip 21 A is formed of a second material. The material of tip 21 A may extend partially or substantially down the length of pin 20. As an example, the material of outer wall 22 may be brass, steel or the like, whereas the material of tip 21 A may be an insulating material e.g. a ceramic. While a tip of insulating material may be used on a pin not have fluid inlet tube 23, it is preferred that pin 20 have a fluid inlet tube.

In operation of the process with pins of the type shown in FIGS. 6A and 6B, a cooling fluid, usually air, water or oil, is passed through fluid inlet tube 23, out of outlet 24 and then passes between fluid inlet tube 23 and outer walls 22, thereby cooling pin 20. The cooling fluid may be used continuously or intermittently. It is preferred that cooling fluid be used continuously, and that the temperature of the fluid be controlled.

In preferred embodiments of the present invention, article 8 is a header or manifold, or part thereof, of a heat exchanger, particularly a heat exchanger formed from thermoplastic polymers.

The drawings herein illustrate the method using only a small number of tubes. However, the method is adaptable and intended for use with a large number of tubes. In particular, the method may be used in bonding at least 10 tubes into an article, especially at least 100 tubes and in particular more than 300 tubes into an article at one time. Thus, the method may be used in the fabrication of articles having a multitude of tubes, of which a heat exchanger is an example. Such bonding of large numbers of tubes may be carried out in one cycle of the process.

In preferred embodiments, the tubes and article may be formed from a variety of polyamide compositions. The composition selected will depend primarily on the end use e.g. the end use intended for a heat exchanger fabricated using an device having tube that has been manufactured using the method described herein, especially the temperature of use and the environment of use of such a heat exchanger, including the fluid that will be passed through the heat exchanger and the fluid e.g. air, external to the heat exchanger. In the case of use of such a heat exchanger on a vehicle, the fluid may be air that at times contains salt or other corrosive or abrasive matter, or the fluid may be liquid e.g. radiator fluid.

A preferred polymer of construction is polyamide. Examples of polyamides are the polyamides formed by the condensation polymerization of an aliphatic dicarboxylic acid having 6–12 carbon atoms with an aliphatic primary diamine having 6–12 carbon atoms. Alternatively, the polyamide may be formed by condensation polymerization of an aliphatic lactam or alpha, omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid, amino undecanoic acid and amino dodecanoic acid. Preferred examples of the polyamides are polyhexamethylene adipamide and polycaprolactam, which are also known as nylon 66 and nylon 6, respectively.

While particular reference has been made herein to the use of polyamides as the polymer used in the fabrication thereof, it is to be understood that other thermoplastic polymers may be used, preferably polymers for the article and tubing that are compatible in the molten form. In addition, the environment of use of devices fabricated using the method of the invention, for example a heat exchanger and the properties of the fluid passing through and over such a heat exchanger, the temperature and pressure of use and the like, are important. Examples of other thermoplastic polymers that may be used are polyethylene, polypropylene, fluorocarbon polymers, polyesters, elastomers e.g. polyetherester elastomers, neoprene, chlorosulphonated polyethylene, and ethylene/propylene/diene (EPDM) elastomers, polyvinyl chloride and polyurethane.

In preferred embodiments, the tubing used in the method of the present has a thickness of less than 0.7 mm, and especially in the range of 0.07–0.50 mm, particularly 0.12–0.30 mm. The thickness of the tubing will, however, depend to a significant extent on the proposed end-use and especially on the properties required for that end-use.

The polymer compositions may contain stabilizers, pigments, fillers and the like, as will be appreciated by persons skilled in the art.

The method of the present invention may be used in a variety of end uses in which tubes formed from a thermoplastic polymer need to be inserted into an article, also formed from a thermoplastic polymer, to form apparatus having fluid flow communication through the tubes through the article from one side of the article to the other. In particularly preferred embodiments, the tubes and article form parts of a heat exchanger particularly a heat exchanger formed from a thermoplastic polymer. As discussed herein, the preferred thermoplastic polymer is an aliphatic polyamide. Such heat exchangers have found use in a variety of end uses, including as automotive heat exchangers in both cooling of radiator fluid and cooling of oil. Other uses may be made of the heat exchangers, e.g. in marine applications.

The present invention provides a versatile method for inserting tubes into articles. The method is economical, versatile and easy to operate. The apparatus required to conduct the process of the invention is relatively simple and not complex.

The present invention is illustrated by the following examples.

EXAMPLE I

A process substantially as described herein was operated using watercooled pins having ceramic tips. The polymer of both the article and the tubing was polyhexamethylene adipamide.

In a series of tests, the temperature of the heating block was varied over the range of about 273–310° C. The cycle used involved bringing the article and heating block into the juxtaposed position, with pins in the tubing, maintaining that position for about 10 seconds and then withdrawing the heating block and pins Air was the passed over the resultant bonded tubes, followed by a mist of air and water for about 10 seconds and finally a stream of water for about 20–30 seconds.

The process operated in an acceptable manner over the above temperature range.

Using the above procedures, up to about 350 tubes were bonded to part of a manifold of a heat exchanger in a single cycle, to give a fluid-tight bond of the tubes to the manifold. Heat exchangers formed in this manner have undergone extensive pressure and temperature testing, with commercially-acceptable results.

I claim:

1. A method for bonding a multiplicity of at least 10 tubes into an article which is part of a header or manifold for a plastic heat exchanger, the tubes and article being formed from a thermoplastic polymer, said article having for each tube a channel extending therethrough from a first surface to a second surface, such channel being linear and being of a shape and size to accommodate said tube in sliding engagement such that the tube may be passed through the article from the first surface to the second surface to provide fluid flow communication through the article; comprising the steps of:

(i) inserting each of said tubes into one of the linear channels such that the tube extends through said article and extends from said first surface to beyond said second surface;

(ii) placing a portion of each of said tubes extending beyond the second surface in sliding engagement over a pin, each said pin being cooled to maintain each pin at a temperature of less than the melting point of the thermoplastic polymer of the tubes, each said pin being located in and extending from a heating block capable of being heated to a temperature of greater than the melting point of the thermoplastic polymer of the tubes;

(iii) controlling the temperature of said heating block at a temperature above said melting point;

(iv) moving said heating block towards the second surface to a position juxtaposed the second surface, such that said portion of each of said tubes contacts the heating block and the polymer of said portion of each of said tubes melts and forms at least a partial coating thereof on said second surface, thereby bonding the tubes to the article;

(v) cooling said article with said at least partial coating thereon; and (vi) separating said article with said at least partial coating thereon from said pins and said heating block.

2. The method of claim 1 in which the tubes and article are formed from an aliphatic polyamide.

3. The method of claim 1 in which the tubes are coated with an adhesive to promote adhesion to the polymer of the article.

4. The method of claim 1 in which each of the tubes is a coextruded tube having inner and outer layers with the outer layer thereof promoting bonding of each of said tubes to the polymer of the article.

5. The method of claim 1 in which the pins are fluid cooled pins.

6. The method of claim 5 in which the pins are water- or oil-cooled pin.

7. The method of claim 2 in which the pins have ceramic tips.

8. The method of claim 2 in which at least 100 tubes are bonded into said article.

9. The method of claim 2 in which at least 300 tubes are bonded into said article.

* * * * *